May 15, 1956     Y. M. PONSAR     2,745,426
ARRANGEMENT FOR ADJUSTING A FLOW OF LIQUID
Filed Feb. 9, 1953     2 Sheets-Sheet 2
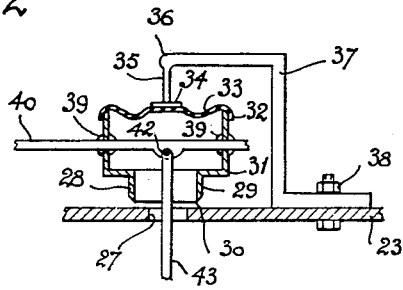
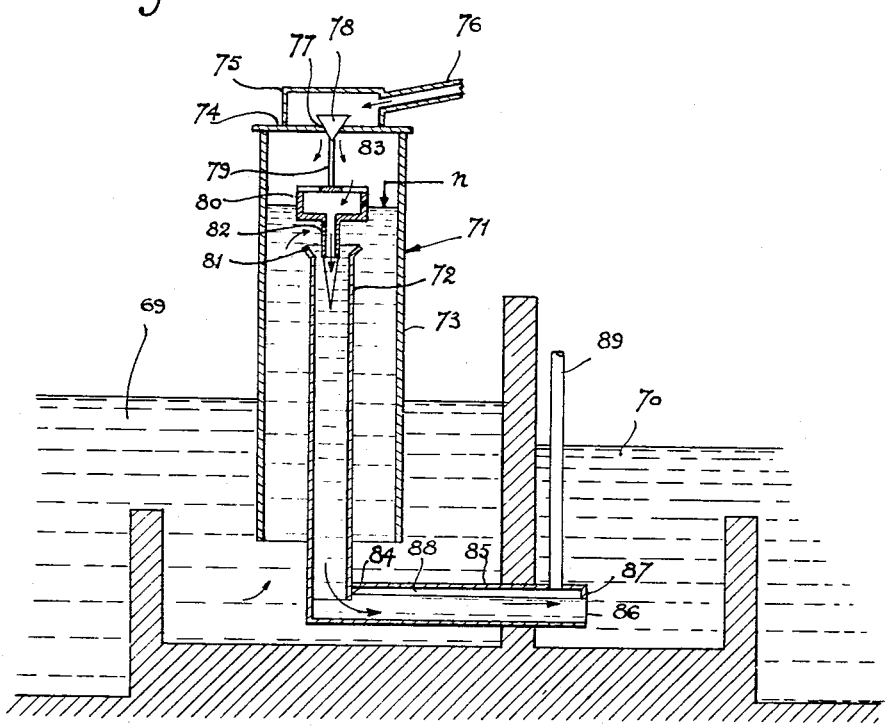
Inventor
Yves M. Ponsar

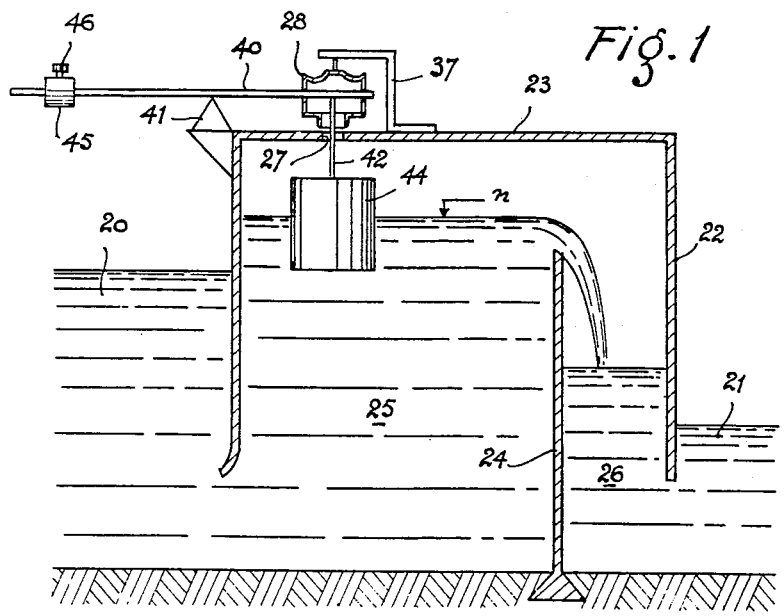
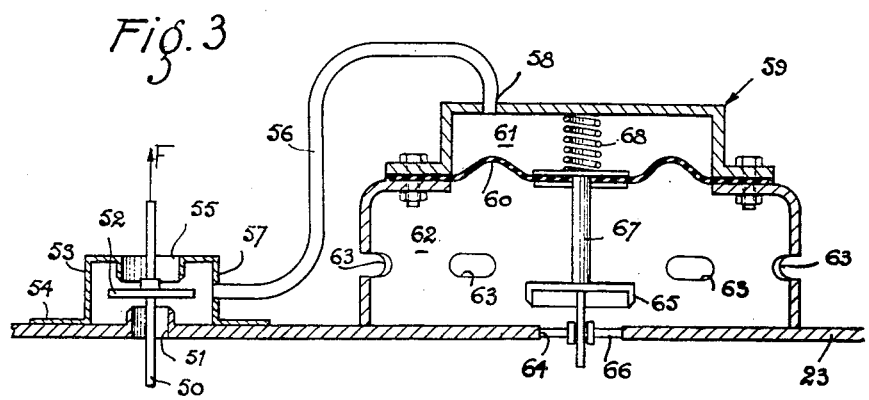

United States Patent Office 2,745,426
Patented May 15, 1956

2,745,426

ARRANGEMENT FOR ADJUSTING A FLOW OF LIQUID

Yves Marie Ponsar, Bois-Colombes, France

Application February 9, 1953, Serial No. 335,749

Claims priority, application France February 20, 1952

11 Claims. (Cl. 137—143)

My invention has for its object means for adjusting the flow of a liquid between an upstream and a downstream hydraulic section as required for rivers, tanks, canals or channels.

A primary object of my invention consists in providing an accurate adjustment to a predetermined value of a liquid flow, independently of all external conditions, whatever said desired predetermined value of the flow may be, whether small or large.

A further object of my invention consists in providing a modification of the predetermined flow as a function of one or more variable quantities.

A still further object of my invention consists in adjusting the flow with a view to producing gas under increased and/or reduced pressure inside a closed chamber or the like.

These objects and further auxiliary objects and advantages are obtained in accordance with my invention by means of an arrangement inserted between the upstream and downstream hydraulic sections, said arrangement including in combination two closed capacities the lower parts of which are connected respectively with the said upstream and downstream sections and contain liquid while the upper parts of the capacities are filled with an aeriform fluid, a liquid-conveying passage connecting the liquid-containing lower parts of the capacities and a passage being provided for connecting the upper gas-filled parts of said capacities, said arrangement comprising further a member dipping into the upper surface of the liquid in the upstream capacity and sensitive to the modifications in the level of liquid therein, a valve system adjusting the gas throughput entering the gas-filled part of one of the capacities and means whereby said valve system is controlled by said level-sensitive member in a manner such that said level remains at a predetermined height and that the liquid flow assumes the desired predetermined value.

By reason of the fact that the level-sensitive member engages the actual liquid level in the upstream capacity for adjusting said level, I obtain an accurate adjustment of the liquid flow which is caused to assume any desired value whatever the latter may be.

I have illustrated by way of example in accompanying drawings various embodiments of an arrangement according to my invention, reference being made to accompanying drawings, wherein:

Fig. 1 is a longitudinal cross-sectional view of a first embodiment of the arrangement according to my invention.

Fig. 2 is a view on a larger scale of a portion of said arrangement.

Fig. 3 is a partial view of a modification of said arrangement.

Fig. 4 relates to a further modification.

In the embodiment illustrated in Figs. 1 and 2, liquid passes out of an upstream tank 20 or the like (Fig. 1) into a downstream tank 21 or the like, through the agency of an arrangement according to my invention. This arrangement designated generally by the reference number 22 includes a coffer 23 provided with an inner overflow partition 24 defining two sections 25 and 26 intended respectively for the rising and sinking of the liquid therein. The rising section 25 has a large horizontal cross-section so that the level $n$ of the liquid in the said section 25 may form a substantially calm horizontal surface.

A port 27 is provided in the upper wall of the coffer 23 in vertical register with the section 25, said port being closed when required by a valve 28. The latter as illustrated in Figs. 1 and 2 includes a cylindrical wall 29 the lower end of which opens at 30 above said port 27, while its upper end is connected with the lower end of a second cylindrical coaxial wall 31 of a larger diameter, the upper end of which defines an opening 32. An elastic diaphragm 33 engages through its periphery the edge of said opening 32 and it is secured through a central disc 34 of suitable area and position to a control rod 35. The latter is secured at 36 to a bracket 37 secured in its turn at 38 to the coffer 23. The valve 28 is secured for instance through welding at 39 to a rocking lever 40, adapted to pivot round the edge of a knife 41 rigid with the coffer 23.

At its end lying nearer the valve, the rocking lever 40 is pivotally secured at 42 inside said valve to a rod 43 passing through the port 27 and carrying a heavy member 44 engaging the level $n$ of the liquid in the section 25 of the coffer. The heavy member 44 is constituted preferably by a vertical cylinder having a large cross-section.

At its other end, the rocking lever 40 carries a slidable weight 45 the position of which may be adjusted along the rocking lever by means of a screw 46. For a given position of the weight 45 along the rocking lever 40, the balance of the latter is obtained when the Archimedean thrust on the heavy member 44 reduces the weight of the latter by a predetermined amount for a given level $n$.

If, for any reason whatever, the level $n$ rises above normal value, the weight of the member 44 is reduced by reason of the increase of the Archimedean thrust and the valve 28 rises so as to allow air to enter the coffer in amounts larger than the output of air drawn away on the downstream side. It is to be noted that the air is drawn away on the downstream side in the form of small air bubbles driven by the liquid flow. This temporary increase in the pressure inside the coffer produces a sinking of the level $n$ such that the shutter moves towards its closing position.

Conversely, if the level $n$ sinks with reference to its normal location, the weight of the member 44 acts to a larger extent on the rocking lever by reason of the reduction in the Archimedean thrust. The valve 28 closes completely and allows no air to enter the coffer. The pressure decreases in the latter and consequently the level $n$ rises and resumes its normal location. It is thus apparent that, to each position given to the sliding weight 45 on the rocking lever, there corresponds a predetermined location of the level $n$ and consequently a constant height of the water mass above the upper edge of the overflow partition 24. An adjustment of the slidable weight along the rocking lever produces thus a predetermined flow of liquid over said partition. It should be remarked that by reason of the valve including two cylindrical walls of different diameters associated with the diaphragm 33, said valve 28 is balanced, i. e., it is not submitted to the pressure prevailing inside the coffer. In this connection, the cross-sectional areas of the annular shoulder between the walls 28 and 29 and of the effective portion of the diaphragm 33 are chosen substantially equal. Any shape of balanced valve differing from that described and illustrated may be resorted to for the purpose of my invention.

By reason of the general arrangement disclosed including such a balanced valve, it will be noticed that the adjustment of the level $n$ at a predetermined height is not modified by the pressure of the gaseous atmosphere inside the coffer. If the upstream level 20 changes, the pressure of the gaseous atmosphere inside the coffer will be automatically modified, but the liquid level $n$ remains unchanged for a given adjustment of the slidable weight.

The adjusting means according to the invention show consequently the remarkable property of allowing an adjustment of the liquid output from the upstream tank 20 independently of the level in the latter.

It has been shown that to each position given to the weight 45 on the rocking lever 40 corresponds a predetermined level $n$ and consequently a predetermined rate of flow. By shifting the weight 45 from one position to another on the rocking lever, there is provided a modification in the adjusted location of the level $n$ and consequently in the rate of flow.

The rocking lever 40 may also carry a scale of flow rates whereby it is possible to produce any desired flow by positioning the slidable weight 45 in register with the corresponding subdivision of the scale.

Instead of an adjustable weight acting on the rocking lever 40, it is obvious that it is possible to exert an adjustable force producing a similar action by means of any other means of a hydraulic, pneumatic, electromagnetic or the like type, said means being independent or else controlled by various desired controls adapted to adjust simultaneously or in succession the throughput of the siphon system through the agency of my improved arrangement.

The arrangement described including a level-sensitive member dipping into the upper surface of a large rising upstream section inside a variable pressure coffer, in association with overflow means, provides thereby a satisfactory and accurate adjustment of the liquid flow, whatever may be the value, whether small or large, desired for said flow, while said adjustment is independent of the height assumed by the level stream upwards with reference to the coffer. The modification illustrated in Fig. 3 is similar to that disclosed in Figs. 1 and 2, except for the fact that the balanced valve is replaced by a pneumatic, electric, mechanical, hydraulic or the like relay that is controlled by the sensitive member dipping into the level $n$ and controlling an independent valve adjusting the admission of air into the coffer.

Fig. 3 shows at 50 the rod connecting the level-sensitive member constituted for instance by an inert body that is not illustrated and that is similar to the weight 44 in Fig. 1. The rod 50 passes through an opening 51 assuming a small diameter and provided in the wall of the coffer 23. The rod 50 carries a disc 52 located inside a casing 53 secured at 54 to the wall of the coffer 23 around the opening 51 therein. The upper part of the casing 53 is provided with an opening 55 coaxial with the opening 51 and the diameter of which is at least equal to that of the latter. The rod 50 passes also through said opening 55 and is connected beyond said casing with control means that are not illustrated and the action of which is illustrated diagrammatically by the arrow F.

An air pipe 56 communicating with the inside of the casing 53 forming a pneumatic relay opens into the side wall 57 of the latter at one end and opens at its other end 58 into a large sized valve system 59 adjusting the admission of air inside the coffer 23. The valve system 59 includes a casing subdivided by a diaphragm 60 into an upper chamber 61 into which opens at 68 the above-mentioned pipe 56 and a lower chamber 62. The latter is provided with openings 63 communicating with the atmosphere while a further opening 64 provided in the wall of the coffer 23 connects the latter with the said lower chamber 62. A cylindrical valve 65, guided by a cross-shaped member 66 is laid inside the chamber 62 in register with the opening 64 and is connected by a rod 67 with the diaphragm 60, a spring 68 extending inside the chamber 61 in alignment with the rod 67 and urging the diaphragm 60 away from the upper wall of the chamber 61.

When, under the action of a sinking of the immersed member, the disc 52 of the relay is lowered into engagement with the port 51, the pipe 56 is connected through the opening 55 with the atmosphere and consequently atmospheric pressure prevails inside both chambers 61 and 62 of the valve system 59 so that, under the action of the spring 68, the valve 65 closes. The coffer is thus cut off from atmospheric pressure and consequently the level $n$ which was too low has a tendency to rise up to the desired adjustment value.

When, on the contrary the immersed member rises and raises the disc 52 of the relay against the opening 65, the pipe 56 is connected through the opening 51 with the pressure prevailing inside the coffer and, consequently, a reduction of pressure occurs inside the chamber 61 of the valve system while atmospheric pressure continues prevailing inside the chamber 62 by reason of the connection provided by the openings 63. This difference in the pressures applied to either side of the diaphragm 60 balances the action of the spring 68 and overcomes it so as to open the valve 65 against the action of said spring. The coffer is now submitted to atmospheric pressure through the openings 66 and 63 in the lower chamber. The level $n$ which was too high sinks consequently down to the desired adjustment value.

The modification illustrated in Fig. 3 is of a particular advantage by reason of its excellent fluid tightness when closed, as provided by the existence of the small sized relay 53 associated with a valve system 59 submitted to larger stresses. Furthermore, the stresses and movements of the rod 50 are reduced which allows using at the level $n$ a small-sized immersed member, together with a relay 53 that need not be balanced. The difference in size between openings 51 and 55 furthers the stability of adjustment.

Turning to Fig. 4 illustrating an arrangement similar to that of Fig. 1 adapted more particularly to form a vacuum machine and/or a compressor, there is shown at 69 an upstream reach or tank feeding with liquid a downstream tank 70 through the agency of a vacuum device according to my invention and which is designated as a whole by the reference number 71. Said device includes two coaxial tubes of substantially different diameters, to wit, an inner tube 72 and an outer tube 73.

The outer tube 73 has its lower end immersed in the up-stream tank 69 while its upper end closed by a plate 74, carries a casing 75 connected by a pipe 76 with the means, not illustrated, in which depression is desired. A port 77 in the covering plate 74 provides a communication between the casing 75 and the upper end of the tube 73, a conical valve 78 being adapted to close or open said port 77. The valve 78 is connected through a rod 79 with a hollow float 80 carried by the liquid level $n$ inside the outer tube 73, said level extending above the upper end of the inner tube 72. The hollow float 80 lies thus above the upper flaring end 81 of the tube 72, while a duct 82 forming a lower extension of the float 80 provides a communication between the upper end of the inner tube surrounding said duct and the space 83 at the upper end of the outer tube 73 between the level $n$ and the covering plate 74.

The lower end of the tube 72 projects at 84 inside a pipe 85 extending horizontally or along a slightly rising line into the downstream tank 70 into which said pipe opens at 86.

For the starting of the machine, it is necessary to produce a reduction of pressure inside the upper space 83 in the outer tube so that the water rises inside the outer tube 73 until it overflows through the upper end 81 of the tube 72 and returns through the pipe 85 into the downstream tank 70. This movement of the water carries along with it air from the upper space 83 through the duct 82 downwardly, the air bubbles being prevented from rising by the projecting lower end 84 of the inner tube 72 and consequently the reduction of pressure in the space 83 increases while the level $n$ rises and raises the hollow float 80.

The priming being thus obtained, reduction of pressure is kept up inside the space 83 by the air being carried along by the pipe 85 on the downstream side and the consequent rising of the hollow float 80 opens the valve 78 which produces a suction of air out of the means connected with the outer end of the pipe 76 towards the space 83. The level $n$ sinks, which closes the valve 77 after which the reduction of pressure increases again inside the space 83, so that the level rises again and opens the valve and this procedure continues until the value of the reduction of pressure is the same inside the space 83, the casing 75 and the means connected through the pipe 76 with said casing.

It should be remarked that the arrangement of the vent or port 82 inside the passage provided for water at 81 ensures an efficient admixture of air and water and consequently an efficient drawing along of air out of the space 83 and of the means in which a reduction of pressure is to be produced.

It will be appreciated that with such an arrangement, it is possible to obtain a large vacuum with a high efficiency by applying a comparatively reduced driving power as constituted by the difference in head between the level $n$ and the lower end of the duct 82. The importance of the depression obtained depends only on the level $n$ and on the level of water in the upstream tank 69 and it may be adjusted by suitably selecting the height of the outer tube 73. Furthermore, the difference between the levels in the upstream and downstream tanks 69 and 70 may be very small.

It should be noticed also that the air fed through the pipe 85 to the output end 86 is compressed and consequently the device which has been described may, in addition to its action as a vacuum device, serve as a compressor. It is sufficient to this end, to position a cover 87 over the upper or outer end of the output end 86 of the pipe 85 so as to form a sort of gas cup 88 in the portion of the said pipe 85 extending between the cover 87 and the lower projection 84 of the inner pipe 72 inside said output pipe. The cover 87 projects inside the output pipe to a lesser extent than the tube 72 at 84 so as to prevent any return of air into said inner pipe 72. A pipe 89 for removing the compressed air connects said gas cup 88 with any means, that are not illustrated, which it is desired to feed with compressed air.

What I claim is:

1. An arrangement for adjusting a liquid flow between an upper and a lower hydraulic section, comprising in combination two closed capacities connected respectively through their lower ends with the upstream and downstream sections and each filled in its lower part with liquid and in its upper part with a gaseous atmosphere, one of the capacities being provided with an opening in its upper part, means through which liquid is adapted to pass out of the lower part of the capacity connected with the upstream section into the lower part of the other capacity connected with the downstream section, means wherethrough the upper parts of the two capacities are connected to allow a passage of gas therebetween, a member dipping into the upper portion of the liquid in the capacity connected with the upstream section, said member being sensitive to the modifications in the level of said liquid, a valve system associated with the opening in the upper part of one of the capacities for adjusting the throughput of gas through said opening and means for operatively connecting said valve system with the level-sensitive member wherethrough the variations in pressure produced by the operation of the valve system constrain the level to assume a predetermined value and the liquid flow to assume a desired value.

2. An arrangement for adjusting a liquid flow between an upper and a lower hydraulic section, comprising in combination two closed capacities connected respectively through their lower ends with the upstream and downstream sections and each filled in its lower part with liquid and in its upper part with a gaseous atmosphere, one of the capacities being provided with an opening in its upper part, means through which liquid is adapted to pass out of the lower part of the capacity connected with the upstream section into the lower part of the other capacity connected with the downstream section, means wherethrough the upper parts of the two capacities are connected to allow a passage of gas therebetween, a member dipping into the upper portion of the liquid in the capacity connected with the upstream section, said member being sensitive to the modifications in the level of said liquid, a control system operatively connected with said member, a valve system associated with the opening in the upper part of one of the capacities for adjusting the throughput of gas through said opening and means for operatively connecting said valve system with the level-sensitive member wherethrough the variations in pressure produced by the operation of the valve system constrain said level and consequently the liquid to be defined solely by the position of said control system.

3. An arrangement for adjusting a liquid flow between an upper and a lower hydraulic section, comprising in combination two closed capacities connected respectively through their lower ends with the upstream and downstream sections and each filled in its lower part with liquid and in its upper part with a gaseous atmosphere, one of the capacities being provided with an opening in its upper part, means through which liquid is adapted to pass out of the lower part of the capacity connected with the upstream section into the lower part of the other capacity connected with the downstream section, means wherethrough the upper parts of the two capacities are connected to allow a passage of gas therebetween, a member dipping into the upper portion of the liquid in the capacity connected with the upstream section, said member being sensitive to the modifications in the level of said liquid and submitted to an adjustable force independent of the action of the liquid, a valve system associated with the opening in the upper part of one of the capacities for adjusting the throughput of gas through said opening and means for operatively connecting said valve system with the level-sensitive member, whereby for any predetermined value assumed by the force acting on the member dipping into the liquid, the level assumes a corresponding height and the flow of liquid assumes a predetermined value, the variations of said force producing corresponding modifications in the flow.

4. An arrangement for adjusting a liquid flow between an upper and a lower hydraulic section and for producing vacuum inside a chamber, comprising in combination two closed capacities connected respectively through their lower ends with the upstream and downstream sections and each filled in its lower part with liquid and in its upper part with a gaseous atmosphere, one of the capacities being provided with an opening in its upper part, means through which liquid is adapted to pass out of the lower part of the capacity connected with the upstream section into the lower part of the other capacity connected with the downstream section, means wherethrough the upper parts of the two capacities are connected to allow a passage of gas therebetween, a member dipping into the upper portion of the liquid in the capacity connected with the upstream section, said member being sensitive to the modifications in the level of said liquid, a valve system associated with the opening in the upper part of one of the capacities for adjusting the throughput of gas between said chamber and the gas-filled part of said one capacity and means for operatively connecting said valve system with the level-sensitive member wherethrough the variations in pressure produced by the operation of the valve system produce vacuum in said chamber.

5. An arrangement for adjusting a liquid flow between an upper and a lower hydraulic section and for producing vacuum inside a chamber, comprising in combination two closed capacities connected respectively through their lower ends with the upstream and downstream sections and each filled in its lower part with liquid and in its upper part with a gaseous atmosphere, one of the capacities being provided with an opening in its upper part, means through which liquid is adapted to pass out of the lower part of the capacity connected with the upstream section into the lower part of the other capacity connected with the downstream section, means wherethrough the upper parts of the two capacities are connected to allow a passage of gas therebetween, last mentioned means extending inside the means providing for the passage of liquid between the lower parts of the two capacities, a member dipping into the upper portion of the liquid in the capacity connected with the upstream section, said member being sensitive to the modifiications in the level of said liquid, a valve system associated with the opening in the upper part of one of the capacities for adjusting the throughput of gas between said chamber and the gas-filled part of said one capacity and means for operatively connecting said valve system with the level-sensitive member wherethrough the variations in pressure produced by the operation of the valve system produce vacuum in said chamber.

6. An arrangement for adjusting a liquid flow between an upper and a lower hydraulic section and for producing a gaseous overpressure in a chamber, comprising in combination two closed capacities connected respectively through their lower ends with the upstream and downstream sections and each filled in its lower part with liquid and in its upper part with a gaseous atmosphere, one of the capacities being provided with an opening in its upper part, means through which liquid is adapted to pass out of the lower part of the capacity connected with the upstream section into the lower part of the other capacity connected with the downstream section, means wherethrough the upper parts of the two capacities are connected to allow a passage of gas therebetween, a member dipping into the upper portion of the liquid in the capacity connected with the upstream section, said member being sensitive to the modifications in the level of said liquid, a valve system associated with the opening in the upper part of one of the capacities for adjusting the throughput of gas through said opening, means for operatively connecting said valve system with the level-sensitive member to produce an intermittent entrance of air into the last mentioned capacity, a gas cup opening into the lower liquid-filled part of the capacity connected with the downstream section and adapted to collect the gas bubbles carried along with the liquid into last mentioned capacity and a pipe connecting said gas cup with said chamber and feeding the latter with compressed gas.

7. An arrangement for adjusting a liquid flow between an upper and a lower hydraulic section, comprising in combination two closed capacities connected respectively through their lower ends with the upstream and downstream sections and each filled in its lower part with liquid and in its upper part with a gaseous atmosphere, one of the capacities being provided with an opening in its upper part, the upper gas-filled parts of said capacities opening into each other, overflow means between the lower liquid-filled parts of the capacities, a member dipping into the overflowing liquid mass of the capacity connected with the upstream section, said member being sensitive to the modifications in level of said overflowing liquid mass, a valve controlling the flow of gaseous medium through the said opening in the upper part of one of the capacities and means operatively connecting said valve with said level-sensitive member, whereby the level of the overflowing mass of liquid assumes a predetermined value and the liquid flow also assumes a desired predetermined value.

8. An arrangement for adjusting a liquid flow between an upper and a lower hydraulic section, comprising in combination two closed capacities connected respectively through their lower ends with the upstream and downstream sections and each filled in its lower part with liquid and in its upper part with a gaseous atmosphere, one of the capacities being provided with an opening in its upper part, means through which liquid is adapted to pass out of the lower part of the capacity connected with the upstream section into the lower part of the other capacity connected with the downstream section, means wherethrough the upper parts of the two capacities are connected to allow a passage of gas therebetween, a member dipping into the upper portion of the liquid in the capacity connected with the upstream section, said member being sensitive to the modifications in the level of said liquid, a balanced valve system associated with the opening in the upper part of one of the capacities for adjusting the throughput of gas through said opening and means for operatively connecting said valve system with the level-sensitive member, wherethrough the variations in pressure produced by the operation of the valve system constrain the level to assume a predetermined value and the liquid flow to assume a desired value.

9. An arrangement for adjusting a liquid flow between an uppper and a lower hydraulic section, comprising in combination two closed capacities connected respectively through their lower ends with the upstream and downstream sections and each filled in its lower part with liquid and in its upper part with a gaseous atmosphere, one of the capacities being provided with an opening in its upper part, means through which liquid is adapted to pass out of the lower part of the capacity connected with the upstream section into the lower part of the other capacity connected with the downstream section, means wherethrough the upper parts of the two capacities are connected to allow a passage of gas therebetween, a member dipping into the upper portion of the liquid in the capacity connected with the upstream section, said member being sensitive to the modifications in the level of said liquid, a valve system associated with the opening in the upper part of one of the capacities for adjusting the throughput of gas through said opening, a relay, means operatively connecting said relay with said valve system and means for operatively connecting said relay and said level-sensitive member, whereby said level assumes a predetermined height and the flow of liquid a predetermined value.

10. A flow-controlling system inserted between two liquid containers, comprising a coffer forming a closed chamber over the cooperating extremities of the two containers, a partition subdividing the lower portion of said coffer into two separate compartments and the upper edge of which forms an overflow ridge, the compartments of the coffer to either side of said partition communicating freely with the corresponding containers, a member dipping into the upper part of the liquid filling the upstream compartment of the coffer and submitted to the action of said liquid, means for exerting an adjustable force on said member in antagonism with the action thereon of the liquid filling said upstream compartment and means whereby said member controls the pressure prevailing inside the coffer over the liquid in both compartments in accordance with the modifications in the level reached by the liquid in the upstream compartment of the coffer to return said level towards a position of equilibrium.

11. A flow-controlling system inserted between two liquid containers, comprising two coaxial tubes dipping into the liquid in the upstream container, the outer tube extending to a greater height than the inner tube and including a perforated cover extending at a distance above the upper end of the inner tube, a valve controlling the perforation in the cover of the outer tube and adjusting the passage of air through said perforation, a hollow float carried by the liquid filling the two tubes up to a level between the cover and the upper end of the inner tube and including a downwardly opening air duct engaging the upper end of the inner tube, said float being perforated in its upper part to allow the air contained in the upper end of the outer tube above the liquid level to enter said duct, means whereby the float controls the valve, a substantially horizontal pipe connecting the lower end of the inner pipe with the downstream container and means for removing the air bubbles passing out of the duct and down the inner tube into the last mentioned pipe.

References Cited in the file of this patent

UNITED STATES PATENTS

| | | |
|---|---|---|
| 848,696 | Shields | Apr. 2, 1907 |
| 2,642,888 | Danel | June 23, 1953 |

FOREIGN PATENTS

| | | |
|---|---|---|
| 11,683 | Great Britain | 1913 |
| 1,020,233 | France | Nov. 12, 1952 |